(12) United States Patent
Bauza et al.

(10) Patent No.: US 7,278,297 B2
(45) Date of Patent: Oct. 9, 2007

(54) OSCILLATING PROBE WITH A VIRTUAL PROBE TIP

(75) Inventors: Marcin B. Bauza, Charlotte, NC (US); Robert J. Hocken, Concord, NC (US); Stuart T. Smith, Charlotte, NC (US)

(73) Assignee: Insitutec, Inc., Charlotte, NC (US)

( * ) Notice: Subject to any disclaimer, the term of this patent is extended or adjusted under 35 U.S.C. 154(b) by 41 days.

(21) Appl. No.: 10/989,744

(22) Filed: Nov. 16, 2004

(65) Prior Publication Data

US 2007/0056362 A1    Mar. 15, 2007

Related U.S. Application Data

(60) Provisional application No. 60/520,500, filed on Nov. 17, 2003.

(51) Int. Cl.
  *G01B 5/28*  (2006.01)
  *G01N 13/10* (2006.01)
  *G12B 21/02* (2006.01)

(52) U.S. Cl. .......................................... 73/105; 73/661

(58) Field of Classification Search .................. 73/105, 73/661
  See application file for complete search history.

(56) References Cited

U.S. PATENT DOCUMENTS

| | | | |
|---|---|---|---|
| 5,247,751 A | 9/1993 | Ohya et al. | |
| 6,246,054 B1 * | 6/2001 | Toda et al. | 250/306 |
| 6,918,286 B2 * | 7/2005 | Kitazawa et al. | 73/105 |
| 7,137,291 B2 * | 11/2006 | Mancevski | 73/105 |

* cited by examiner

*Primary Examiner*—Daniel S. Larkin
(74) *Attorney, Agent, or Firm*—Clements Walker; Christopher L. Bernard (57) ABSTRACT

An oscillating probe of an elongated rod, having a first free end, and a second end that is attached to at least one actuator to apply oscillation cycles to the rod. Oscillation of the elongated rod during at least one complete cycle of oscillation of the actuator causes the free end to move in at least one-dimensional envelope, producing a defined virtual probe tip geometry at the free end. The probe is connected to a system for utilizing information sensed as the free end is placed near a surface.

18 Claims, 6 Drawing Sheets

OSCILLATING PROBE WITH A VIRTUAL PROBE TIP

CROSS-REFERENCE TO RELATED APPLICATIONS

This application claims priority from Ser. No. 60/520,500 filed Nov. 17, 2003, which is incorporated herein by reference.

FIELD OF THE INVENTION

This invention relates to the method and device for sensing proximal interactions with a surface. In particular, it relates to the use of an oscillating rod to provide a virtual probe tip on an oscillating type touch probe.

DESCRIPTION OF RELATED ART

Measurement of changes in the characteristic response of oscillating sensors as a method of detecting contact or surface proximity has been used for many years (U.S. Pat. No. 5,247,751). Recently, there has been a drive to produce these types of touch sensors to be small enough to fit inside holes of diameters considerably less than one millimeter.

However, a major challenge for small sensors is to shrink the size of the probe sphere (or other shaped solid) attached at the free end of the oscillating rod that researchers have previously used as a reference surface to abut the work-piece to be measured. This constitutes the geometrically defined solid tip. The reason for this geometrically defined solid tip is to protrude beyond the oscillating rod to ensure contact with the surface is at the location of the tip.

The essence of this invention is to overcome these problems by eliminating the need for the geometrically defined solid tip. In this invention, this problem is eliminated by using the oscillation of the rod itself to produce a defined tip geometry. This rod can be of arbitrary size and shape. As well as using standard off-the-shelf supplies of rods and tubes, other components referred to as fibers, nanotubes, whiskers, etc can be used in this invention.

It is therefore an object of this invention to provide an oscillating probe with a virtual probe tip, without a defined solid contact tip, that has many uses, including determination of the shape and size of a) fuel injection holes in automotive fuel injectors, b) holes in three-dimensional chip structures for placement of conductors in the manufacture of silicon integrated circuits, c) for fluid channels in heat exchangers and other heat transfer environments, such as turbines and jet engines, d) gas or liquid flow restrictors, e) inkjet nozzles, f) MEMS devices, g) surface profilometry, h) small gaps or any other small features, dimensions and shapes.

Other objects and advantages will be more fully apparent from the following disclosure and appended claims.

SUMMARY OF THE INVENTION

The invention herein is an oscillating rod providing a virtual probe tip on a oscillating type touch probe. The oscillating probe comprises an elongated rod, having a first free end, and a second end that is attached to at least one actuator to apply oscillation cycles to the rod; wherein the oscillation of the elongated rod during at least one complete cycle of oscillation of the actuator causes the free end to move in at least a one-dimensional envelope, producing a defined virtual probe tip geometry at the free end. Further the invention preferably comprises a system for utilizing information sensed as the free end is placed near a surface. Other objects and features of the inventions will be more fully apparent from the following disclosure and appended claims.

DETAILED DESCRIPTION OF THE INVENTION AND PREFERRED EMBODIMENTS THEREOF

The present invention for an oscillating probe, comprises an elongated rod, having a first free end, and a second end that is attached to at least one actuator to apply oscillation cycles to the rod; wherein the oscillation of the elongated rod during at least one complete cycle of oscillation of the actuator causes the free end to move in an at least one-dimensional envelope, producing a defined virtual probe tip geometry at the free end. By a one-dimensional envelope, it is implied that the rod is oscillating in a single direction so that the axis will define an area while the tip will reciprocate in a line during a complete cycle of oscillation. By a two-dimensional envelope, it is implied that the rod is oscillating in two directions so that the axis will define a surface while the tip will reciprocate around a loop during a complete cycle of oscillation. Similarly, a three-dimensional envelope will be formed by oscillating the probe in three directions. Further, the invention preferably comprises a system for utilizing information sensed as the free end is placed near a surface or is pressing against that surface, this system preferably comprising at least one sensor to measure changes in oscillation as forces are applied to the said probe; at least one sensor that can measure the probe response; and at least one sensor control circuit that can control at least one of the temporal components of the signal.

The rod may be attached to the actuator in a manner to vary the amplitude of oscillations in different directions. Also, the amplitude of oscillation can be varied to provide a virtual probe of different size. The characteristic oscillation shape can be varied in frequency in different directions to result in different sensitivities in different directions. The change in shape of the oscillation of the probe upon contact or surface proximity can be used as an indication of contact.

Preferably, the system for taking sensed information comprises a sensor control circuit that can generate an oscillating signal and monitor the amplitude and phase of the response of the probe. In one embodiment, the sensor control circuit, analog signals are converted into digital numbers for the purpose of implementing a digital controller the output of which is at least one analog signal.

The invention herein also includes a method of determining surface characteristics of a substance, comprising the probe discussed herein, oscillating the actuator to apply oscillation cycles to the rod to produce a defined virtual probe tip at the free end; and moving the free end near the surface.

In the invention herein, it is important that the rod be relatively flexible (i.e., long and slender) so that the amplitudes of oscillation are greater than the diameter of the rod (that the natural frequency of the rod is lower than the frequency of oscillations of the actuator).

To see how the invention works, consider a simple cantilever beam that is oscillated. Oscillations of the cantilever beam can be induced by mounting it on a piezoelectric oscillator, such as a quartz tuning fork (U.S. Pat. Nos. 5,625,957; 5,782,004; and 6,327,789,) or subjecting it to an electric field (U.S. Pat. No. 6,600,323). Any other means of mechanical oscillation may be used. At suitable excitation frequencies, the beam will be deflected with a characteristic mode shape with this shape varying sinusoidally with amplitude. Typically, this mode shape will involve the free end moving laterally a distance that is greater than the amplitude of motion at other points along the rod, at least for an appreciable distance, see FIGS. 1, 2 and 3. Hence, if the oscillating rod is mounted vertically and moved towards a vertical surface, the free end of the oscillating rod will come into close proximity to this surface, at which point the oscillation characteristics will change and this change can be monitored to detect the surface location.

Figure 1:
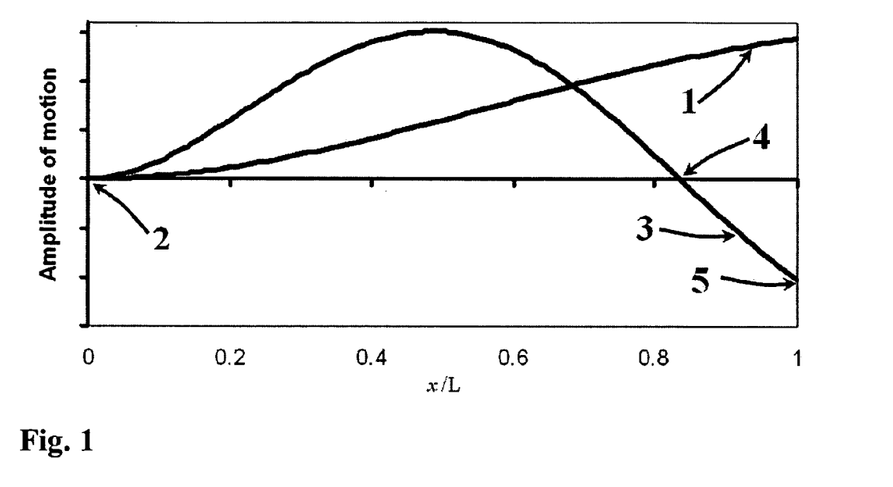
FIG. 1 is a plot of the mode shapes for a cantilever beam of uniform cross section.

FIG. 1 shows the characteristic shapes (called mode shapes) of a uniform cantilever beam for the first two modes that occur at different frequencies (often called natural frequencies). These characteristic shapes are often referred to as standing waves and considered to be the superposition of waves traveling in equal and opposite directions along the rod. In the case of lateral oscillations, these traveling waves proceed along the rod with a velocity that is inversely proportionate to the wavelength and is therefore a function of frequency (see Rayleigh, J. W. S., The theory of sound, 1929 edition of 1945 reissue, Dover Publications, ISBN 486-60292-3, section 191). FIG. 1 shows a snap-shot of the oscillating rod and, over time, this amplitude will diminish proportionately, from a maximum amplitude ultimately reducing to zero thereafter reversing to form a shape that is a mirror image about the x axis and then proceeding to return to the original shape after one complete cycle of oscillation. The first mode 1 represents motion of the rod in which the only stationary point (often called a node) occurs at the support 2. The second plot 3 shows the mode shape of the second mode natural frequency. In this case there is a second node located at point 4 that represents the first node from the free end of the rod. It is possible to operate this probe at any frequency, although it is expected that the sensitivity of the probe will be increased if the frequency of oscillation occurs near to a natural frequency of the probe system, which can be determined as is known in the art.

Figure 2:
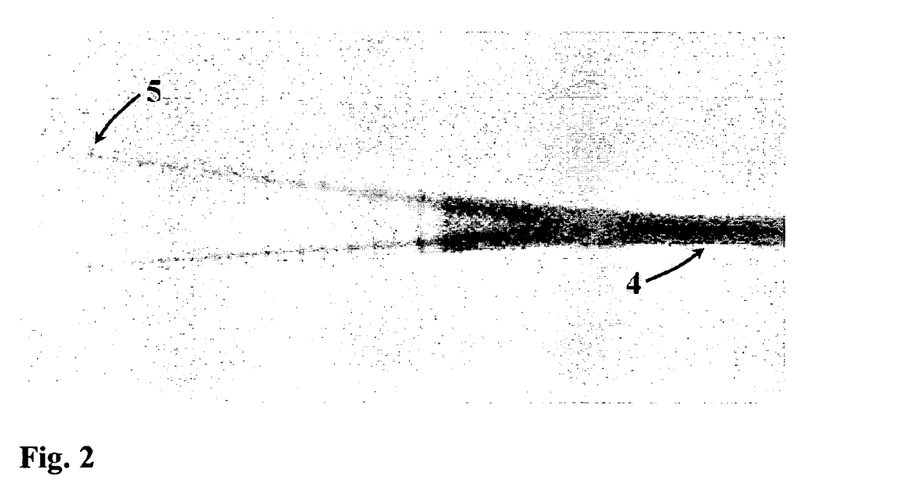
FIG. 2 is a microscope photograph of an oscillating probe end.
Figure 3:
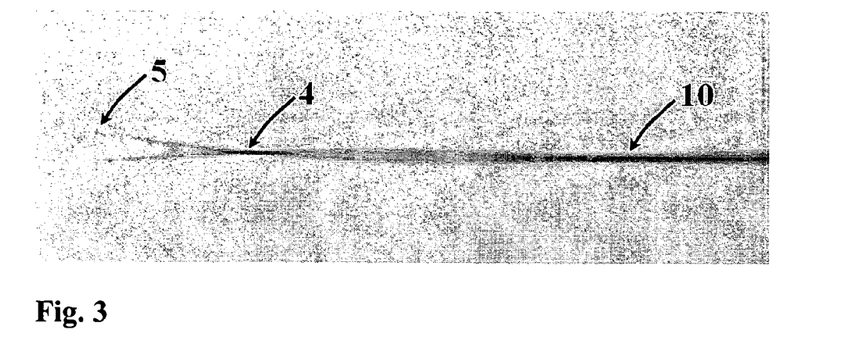
FIG. 3 is a microscope photograph of an oscillating rod.

FIG. 2 shows a microscope image of a probe that is oscillating at a frequency of 32 kHz. In this picture only the region between the last node 4 and the free end 5 of the oscillating rod is visible. FIG. 3 shows a longer region of the oscillating probe of FIG. 2 in which a further node 10 is visible. In practice, for a given excitation frequency there will be at least one node between the fixed support and the free end.

Figure 4:
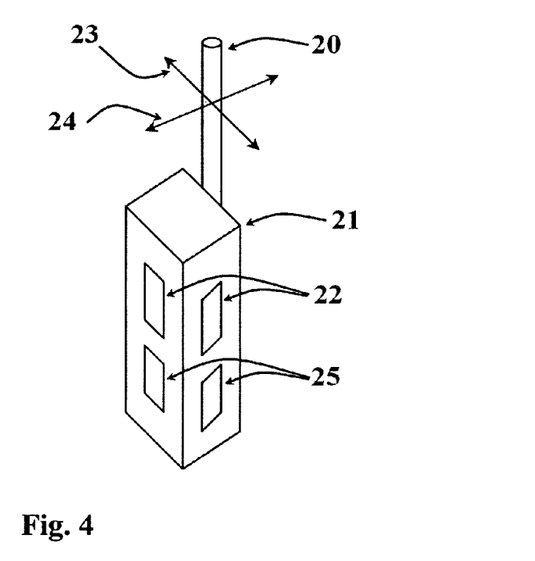
FIG. 4 is a schematic depiction of an oscillating probe attached to a piezoelectric oscillator with two independent oscillation axes.

As a further extension, consider a rod that is rotationally symmetric. In this case, it has been found that, upon excitation at particular frequencies, the oscillation will often consist of oscillatory lateral motions that can have constant magnitude in the two orthogonal directions. In this case the motion of the rod at any point will follow a circular or elliptical path. For the former type of oscillation, this circular path will be a local maximum at the free end and will diminish in amplitude up to the first node. Further along the rod the amplitude of the motion will further increase although this is of little import for the purpose of this invention disclosure. Clearly, any surface moving into the region occupied by this oscillating tip will produce a change in the oscillation characteristic of this rod. In this case we can consider such a probe to have a virtual probe tip defined by this shape at its free end. The size of this shape can be varied by varying the amplitude of the oscillator. In practice, it might be desired to individually vary the amplitude of the oscillations in different directions or different frequencies. For example, to obtain an oscillatory motion that has a desired ellipticity and magnitude, consider the embodiment shown in FIG. 4. In this case, the oscillating rod 20 is attached to a piezoelectric crystal 21 that has a rectangular shape with four electrodes 22 deposited on the longest sides of the crystal. Each electrode pair on opposing faces can then be used to apply an alternating field that, if suitably designed, will result in lateral oscillation in a direction perpendicular to the plane of the electrode pair 23. The other electrode pair can likewise be used to oscillate the rod in a direction perpendicular to its plane 24. In this particular example, it is possible to monitor the voltage and charge transferred to the sensor electrode pairs 25. As the probe response varies, so too, will the amplitude and phase of the current (rate of charge transfer) and voltage. From these signals the amplitude, phase and frequency of the probe response can be measured.

In general, the characteristic shape of the oscillation at the end of the probe in combination with the rod geometry in this region will define the shape of the virtual probe tip. This probe tip will then be defined as the at least one-dimensional envelope of the region occupied by the probe during at least one complete cycle of oscillation.

If the oscillating probe is brought into the proximity of a surface that is normal to the probe axis, the surface interaction forces will also produce a significant change in the response. Consequently, this probe system will be sensitive to surface interactions applied in a direction along the probe axis. It is expected that the range of operation of the probe in this direction will be smaller than for the other two directions. However, this might be of importance for touch trigger probes, crash detection or scanned probe adaptations.

Figure 5:
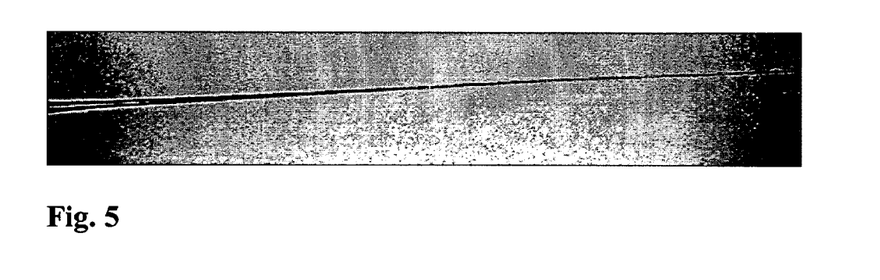
FIG. 5 is a microscope photograph of a stretched optical fiber 10.5 µm diameter and 3.3 mm length.

In another embodiment, the rod can be thinned towards the free end to ensure that the amplitude of oscillation is greatest at this point. A photograph of such a rod produced by stretching a heated optical fiber is shown in FIG. 5 in which a thin fiber of initial diameter 10.5 micrometers at the left side of the photograph is tapered to approximately 3 micrometers at the tip on the right side of the photograph as shown (the width of the photograph being 3330.9 μm or about 3.3 mm). However, this invention is not restricted to the material of construction and could be made from polymeric, carbon, metallic, glass, ceramic or organic fibers with or without any suitable coatings. This is also not restricted in size, and thus there may be rods according to the invention ranging from meters or more in length for geological scale studies to nanometers for molecular scale studies.

Figure 6:
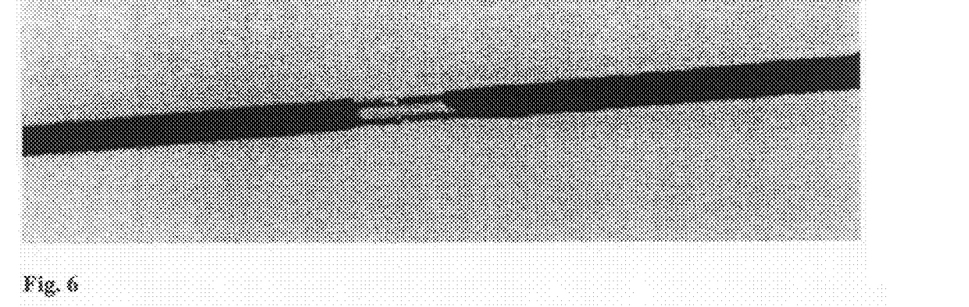
FIG. 6 is a microscope photograph of a coated fiber.

While the virtual probe can be used for small and conventionally sized Coordinate Measuring Machine (CMM) probes, there is a potential problem with the nature of the contact forces that arises as the probe size or contact force reduces. Present in all contacts is the interaction between two solids. This can result in both contact and non-contact forces due to solid-solid repulsion, chemical adhesion, van der Waal, Casimir effect, and meniscus forces if there are liquids on any surface and electric dipoles hereafter collectively referred to as the interaction forces between the probe tip and specimen surface. The electric dipole forces are generated by a potential difference between the two solids due to either voltage differences between the two surfaces or through surface charge effects if either the specimen or probe is an insulator or has an insulating surface layer. For small oscillating rods, the electric dipole forces have been observed to produce significant attractive forces that effectively 'stick' the probe tip to the surface. For rods comprising insulating material, this effect can be reduced, or increased if desired, by coating the rod with a conducting film, such as tungsten, gold, silver, or chrome, and connecting this to the specimen. Oscillation of the rod also helps to attenuate the effects of forces of interaction between the probe tip and specimen surface. An illustration of a coating, FIG. 6 shows a microscope image of a short length of the rod in the center of which the metallic coating has been removed to reveal the glass rod underneath. As well as enabling adjustment of electrostatic forces, an additional coating will result in a stiffening of the oscillating rod. Alternatively, the rod can be made from an electrically conducting material, such as a carbon rod or tube. As the rod stiffens, its amplitude of oscillation will reduce for a given input energy as well as the magnitude of deflections due to interactions between the probe tip and specimen (see Rayleigh's Theory of Sound, section 166 equation).

Figure 7:
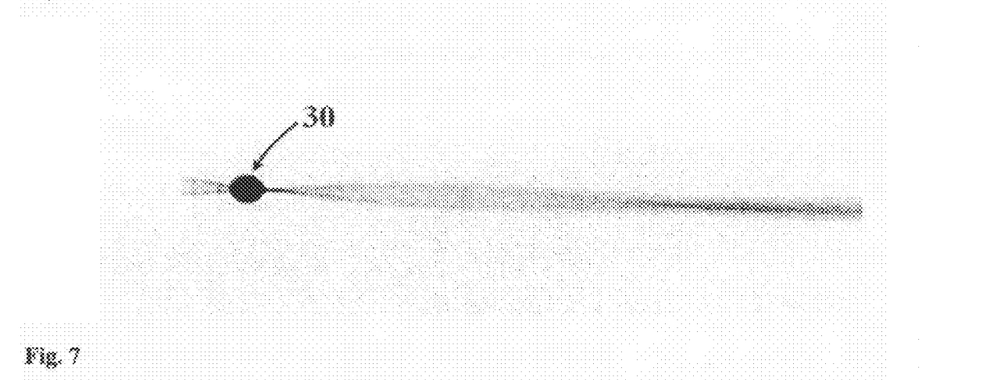
FIG. 7 is a microscope photograph of an oscillating rod with added mass in nodal point.

In a final embodiment, it might be desirable to attach a mass on the oscillating rod, so that there is a short area of the tip of the rod extending beyond the mass. This can be used to either tune the modal frequency to a desired value and/or move a nodal point on the rod. When the mass is used to move the nodal point, this can have the benefit of reducing the amplitude of oscillation for a given excitation energy, thereby enabling the tuning to smaller virtual probe geometries. Alternatively, by moving it further away from the tip, it may be used to increase the amplitude. For example, the probe of 50 μm shown by the oscillating optical fiber in FIG. 2 is difficult to control for smaller oscillation amplitudes. However, attaching at least one mass toward the end or at one or more points along the oscillating rod can alter the oscillation amplitude. For example, a rod similar to that shown in FIG. 2 had a mass 30 attached near the free end after which the amplitude could be readily adjusted to be 29 μm at the free end as illustrated in FIG. 7. It is noted that the size of the probe is not relevant to this invention. However, as size reduces, the natural frequency of a rod will increase for a given geometry. Therefore, the smaller rods are expected to produce the faster dynamic response to applied forces and may be more sensitive to small forces. A preferred mass 30 is a room-temperature hardening polymeric liquid, such as epoxy glue, that is put on the probe and allowed to harden, forming a ball. It is also envisaged that material can be removed from selected portions along the rod to locally thin the rod in a given direction. This will result is a loss of stiffness in a particular direction at a defined location along the rod. A possible consequence of locally thinning the rod will be a change in the mode shape with substantial bending occurring in the region of thinning.

In some cases the probe may be required to operate at specific frequencies. This can be achieved through tuning. Tuning can be achieved by changing the dimensions of the probe or depositing or removing additional material or changing the resonant structure of the support at the base of the probe as is known in the art.

Figure 8:
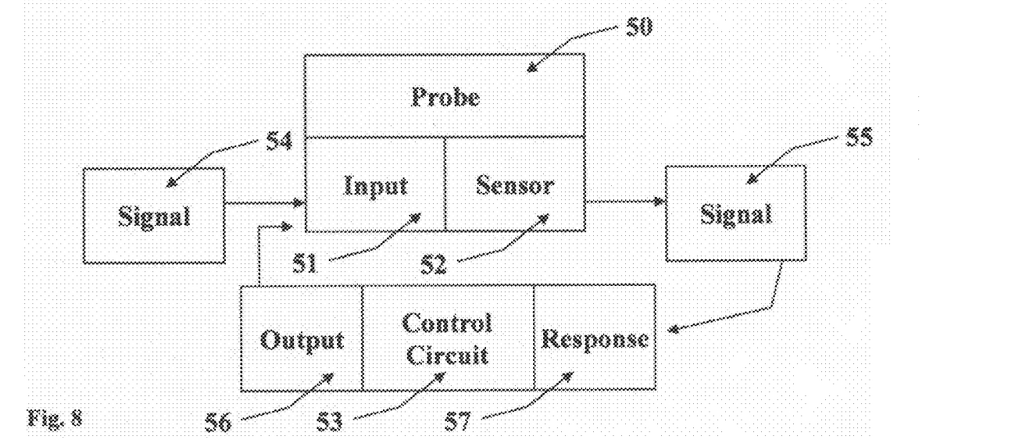
FIG. 8 is a block diagram indicating major components of the probe measurement system.

The operation of the at least one sensor control circuit can be represented by the block diagram shown in FIG. 8. The probe 50 is represented by a block that has a signal 54 applied to the input 51 of amplitude A and frequency ω that is produced by the control circuit. The response of the probe to this signal is then monitored by a sensor 52 that measures the amplitude, phase and frequency. The sensor that converts the motion of the probe to an electrical signal 55 can be a piezoelectric, optical, strain-gage, capacitance, inductance or magnetic sensor, the principles of which are commonly known by those skilled in the art. Based on the measured components of the response 57, these being the amplitude, frequency and phase shift of the output 55, the control circuit 53 can be programmed to operate in a variety of sensing modes. In one mode, the control circuit 53 is simply programmed to provide a fixed oscillation frequency at its output 56 and the response of the probe 55 is measured in terms of either the components of amplitude or phase 57. In some cases the products of amplitude and phase may be used as a measure of the probe response. In a second mode, the control circuit 53 is programmed to vary the frequency at the output 56 to maintain the phase shift between the input signal 54 and output signal 55 at a constant value. In this second mode, the output signal that is used as the measure of the probe interaction with the specimen surface can be either the frequency or the amplitude. In all of the above modes of operation, it is possible to derive further response measurements by combining these components of the response. For example, in the first mode operation it might be desirable to create a signal from the product of the amplitude and phase signals while in the second mode the product of frequency and amplitude might be used. Clearly, scaled products as well as variants of simple products could be implemented.

Figure 9:
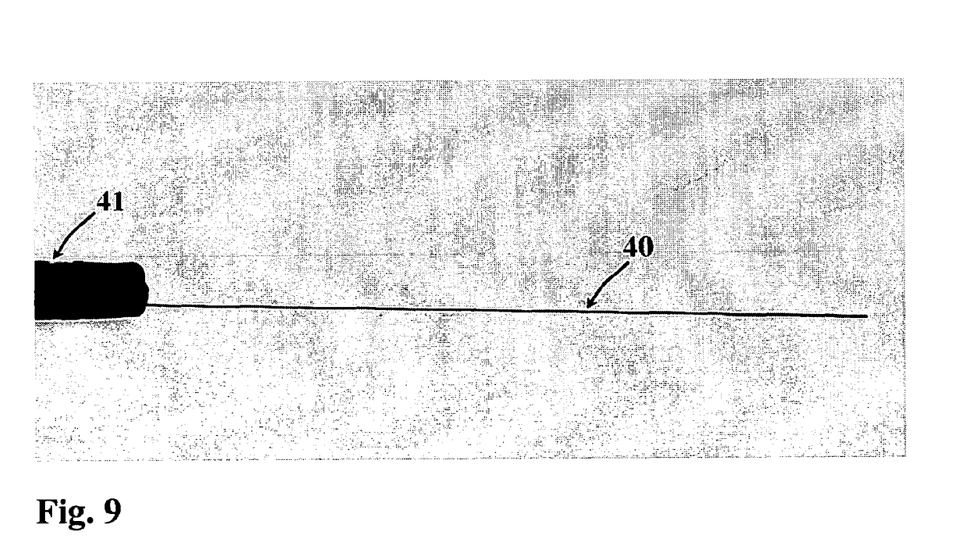
FIG. 9 is a photograph of a thin probe attached to the free end of an oscillator shown in its stationary state.
Figure 10:
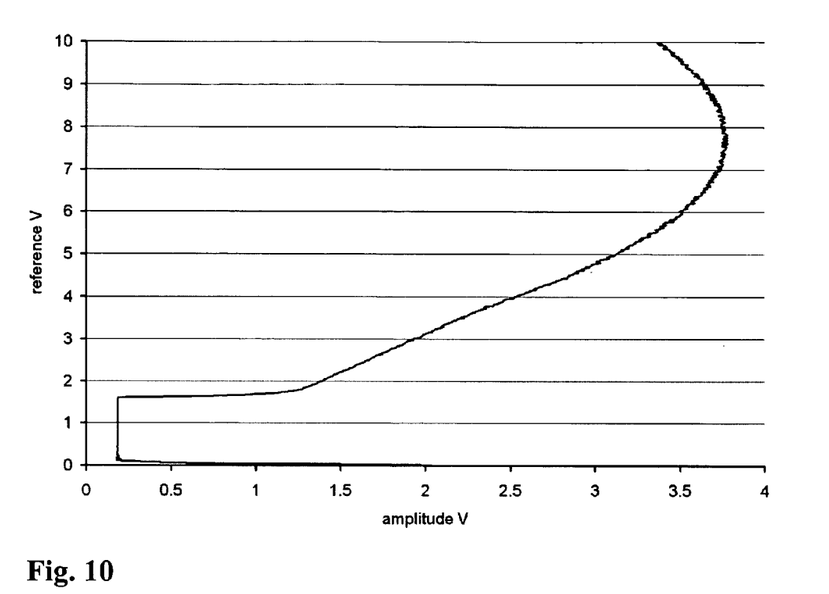
FIG. 10 is a graph of the measured amplitude response of the virtual probe as a function of phase angle.

As an example of operation of this type of probe, a thin fiber 40 of diameter seven micrometers was bonded to an oscillator 41 with the fiber extending approximately 4 mm from the free end of the oscillator, as shown in FIG. 9. The oscillator can be excited over a range of frequencies and the subsequent response of the complete probe measured in terms of the amplitude, phase or frequency using a circuit represented in FIG. 8. FIG. 10 shows the amplitude of the sensor response as the phase shift between the input oscillation and the probe response is varied. In this experiment, the probe was freely suspended in air. During this measurement the frequency is also varying with the phase. Any combinations of these measurements can be used as a signal from the probe. This corresponds in the block diagram of FIG. 8 to the control circuit operating to vary ω to produce a phase φ and this phase reference was then linearly changed while changing a reference voltage (recorded on the y-axis of the graph) while the amplitude response was measured. It is noted that, in this experiment, the circuit could not control the frequency to maintain the phase shift when the phase reference voltage was below approximately 1.8 V.

Figure 11:
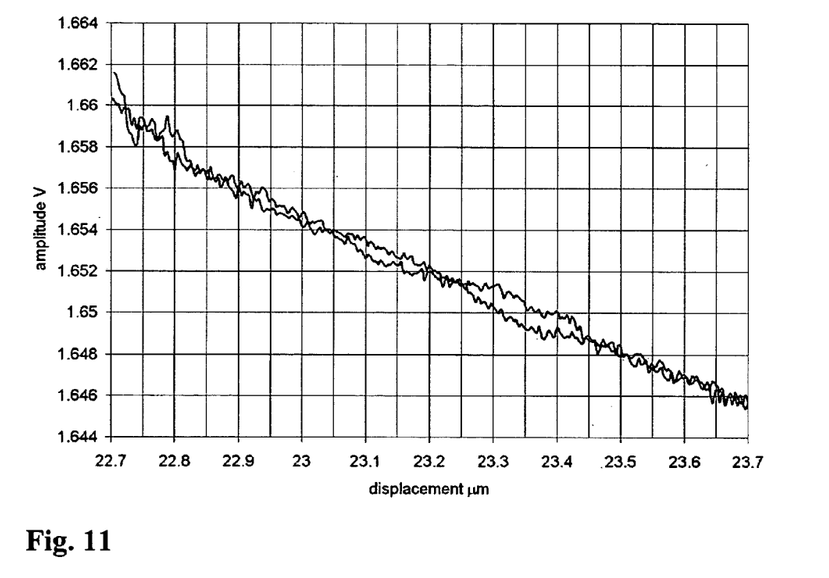
FIG. 11 shows the amplitude of the sensor signal as a function of distance of the probe from a flat steel surface.

In a second experiment to assess the sensitivity of this probe, the phase was adjusted to produce a signal that provides an optimal signal to noise ratio. This phase was then maintained at a constant value throughout the experiment. This was then moved to the near proximity of a flat steel surface, the steel surface being parallel to the probe axis and motion being in a radial direction towards the probe axis. This surface was then moved towards the probe tip until a significant signal was monitored. Thereafter, the steel surface was translated a distance of one micrometer towards and away from the probe while measuring the output signal from the sensor (in this case the signal corresponded to the amplitude response). This corresponds to moving the tip of the probe a distance of one micrometer by pressing with the steel surface. The subsequent sensor signal obtained during this experiment is shown in FIG. 11.

Figure 12:
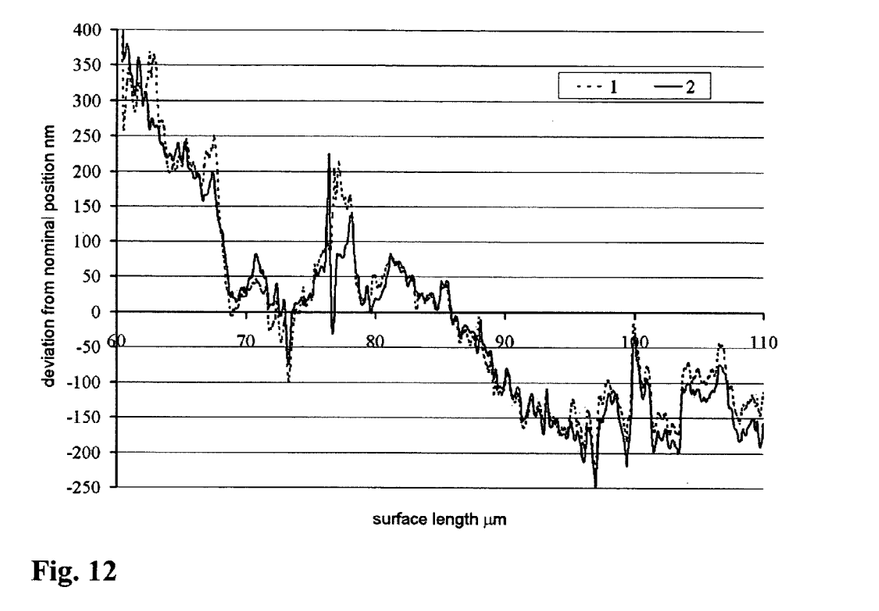
FIG. 12 is a plot of repeat scans over a flat steel surface.

To demonstrate the use of this as a scanning probe, the probe tip was controlled to maintain a constant interaction with a steel surface. In this experiment the probe could be translated towards or away from the surface and the steel surface could be translated in a direction perpendicular to the probe translation. The probe translation device was then used to move the probe to maintain a constant signal level while the steel surface was translated perpendicular to the probe translation direction. In this case the probe will be traversed to maintain a constant signal while the surface is translated. This is similar to the control method used for scanned probe microscopy, Young et al., 1972. Consequently, surface features, such as microscopic asperities, should be apparent as a change in the probe translator position. FIG. 12 shows two repeated measurements of the probe translation as the steel surface was scanned a distance of fifty micrometers.

While the invention has been described with reference to specific embodiments, it will be appreciated that numerous variations, modifications, and embodiments are possible and may be envisaged by those skilled in the art., and accordingly, all such variations, modifications, and embodiments are to be regarded as being within the spirit and scope of the invention.

What is claimed is:

1. An oscillating probe, comprising: an elongated rod, having a first free end, and a second end that is attached to at least one actuator to apply oscillation cycles to the rod; wherein the oscillation of the elongated rod during at least one complete cycle of oscillation of the actuator causes the free end to move in at least a one-dimensional envelope, producing a defined virtual probe tip at the free end, wherein a shape of the virtual probe tip is defined by both a characteristic shape of the oscillation of the free end and a geometry of the rod.

2. The probe of claim 1, wherein the rod is sufficiently slender that the natural frequency of the rod is lower than the frequency of oscillations of the actuator.

3. The probe of claim 1, further comprising:
at least one sensor to measure changes in oscillation as forces are applied to the probe;
at least one sensor that can measure the probe response; and
at least one sensor control circuit that can control at least one temporal component of a signal.

4. The probe of claim 3, wherein the sensor control circuit can generate an oscillating signal and monitor the amplitude and phase of the probe response.

5. The probe of claim 3, wherein the components of the probe response measured by the at least one sensor control circuit are the frequency, amplitude and phase of the signal.

6. The probe of claim 3, wherein the at least one sensor control circuit can generate an oscillating signal and monitor the amplitude and phase of the probe response and accordingly change the oscillation frequency to maintain the phase at a constant value as a characteristic response changes in response to forces applied to the probe tip.

7. The probe of claim 6, wherein the at least one sensor control circuit can produce a signal that is representative of the oscillation frequency variation.

8. The probe of claim 6, wherein the at least one sensor control circuit can produce a signal that is a combination of the measured response values.

9. The probe of claim 3, wherein in the at least one sensor control circuit, analog signals are converted into digital numbers for the purpose of implementing a digital controller, the output of which is at least one analog signal.

10. The probe of claim 1, further comprising at least one mass attached to the rod.

11. The probe of claim 10, wherein the at least one mass is attached to the rod at any distance from the free end along the rod.

12. The probe of claim 1, wherein the rod is rotationally symmetric or polygon shape in cross section.

13. The probe of claim 1, wherein the rod is attached to the actuator in a manner to produce and vary the amplitude of oscillations in at least one direction.

14. The probe of claim 1, wherein the amplitude of oscillation can be varied to provide a virtual probe of different size.

15. The probe of claim 1, wherein a characteristic oscillation shape can be varied in amplitude in at least two directions to result in different virtual probe shapes.

16. The probe of claim 1, wherein a characteristic oscillation shape can be varied in frequency in different directions to result in different sensitivities in different directions.

17. The probe of claim 1, in which a change in shape of the oscillation of the probe rod upon contact or surface proximity can be used as an indication of contact.

18. The probe of claim 1, further comprising a metallic conductor film coating the rod.

* * * * *